Jan. 26, 1932.          H. LANGENBACH                1,842,789
             METHOD OF MAKING CIRCULAR SAWS WITH INSERTED TEETH
                          Filed May 27, 1931
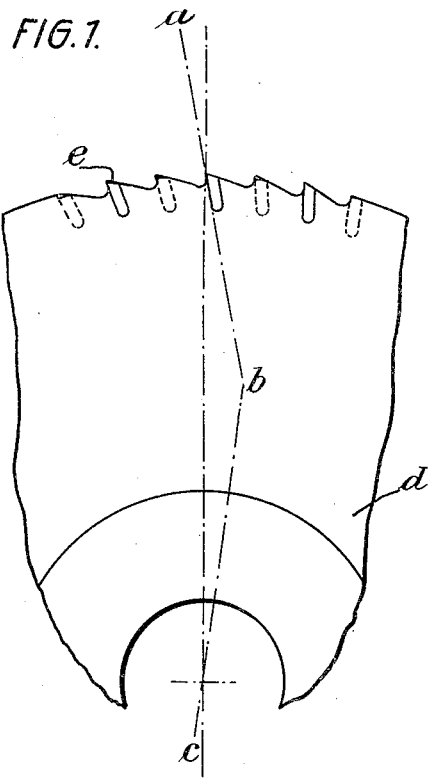
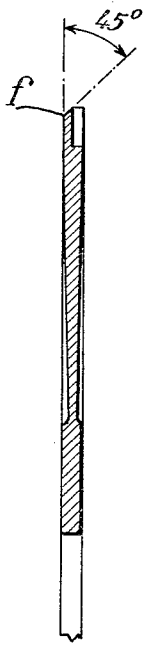
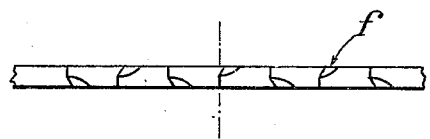
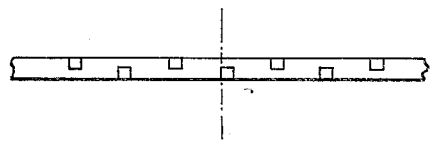
Inventor:
Heinrich Langenbach Patented Jan. 26, 1932

1,842,789

UNITED STATES PATENT OFFICE

HEINRICH LANGENBACH, OF FRANKFORT-ON-THE-MAIN-RODELHEIM, GERMANY

METHOD OF MAKING CIRCULAR SAWS WITH INSERTED TEETH

Application filed May 27, 1931, Serial No. 540,333, and in Germany October 27, 1930.

Forms of construction of circular saws are known in which the teeth are alternately inserted in cavities on both sides of the saw blade. These constructions are however all open to various serious objections. No matter whether in the known constructions the teeth are fixed by rivets or screws or by casting in with composition, a greater portion, if not the whole of the cutting material from which the teeth are made, is lost as it is required for fixing the teeth, so that, when using expensive hard metal, such constructions have not proved satisfactory for economical reasons. A further disadvantage consists in that with the known constructions the teeth project laterally and radially from the saw blade, thus increasing the danger of breakage and causing an unsteady, hacking cut.

These objections are overcome according to the invention which is based on the principle that a tight seating of the exchangeable teeth in an, as far as possible, unweakened saw blade is a primary condition for the good working of the saw, and that there is a possibility of utilising the teeth or the inserted hard metal right up to the smallest remainder.

For this purpose the teeth are according to the invention soldered in along their entire length so that they project neither in radial direction nor laterally from the saw blade, the portion of the cutting edge belonging to the saw blade being removed by grinding away.

An embodiment of the invention is illustrated by way of example in the accompanying drawing in which:

Fig. 1 shows a part side elevation of the saw blade with inserted teeth.

Fig. 2 is a section on line $a, b, c$ of Fig. 1.

Fig. 3 is a top plan view of the saw blade with cutting teeth.

Fig. 4 is a top plan view, showing the cavities in the saw blade.

A suitably tough saw blade $d$ accommodates teeth $e$ made of high-grade cutting metal. The teeth $e$ are inserted in alternating lateral cavities (Fig. 4) on the two sides of the saw blades $d$ and are soldered on all their bearing surfaces to the blade $d$.

The portion of the cutting edges belonging to the saw blade and indicated by $f$ are removed by grinding away (Figs. 2 and 3).

It will be clear that by this method of fixing the tooth material can be used up to the last piece. The saw blade $d$ is not unnecessarily weakened by holes. The teeth $e$ are strongly supported by the saw blades $d$ in the back of the cutting edges so that the danger of fracture is reduced to a minimum. Finally the teeth project neither laterally nor radially from the blade, which is extremely important for obtaining a clean cut.

By grinding away the portion of the cutting edges belonging to the saw blade, a good clip distribution and therefore a steady cut is obtained.

I claim:

A method of producing circular saws with inserted teeth, consisting in inserting the teeth alternately in cavities on the two sides of the blade, in soldering the teeth along their entire length to said blade so that they project neither radially nor laterally from said blade, and in grinding away the portion of said blade belonging to the cutting edge.

In testimony whereof I affix my signature.

HEINRICH LANGENBACH.